United States Patent
Nakata et al.

(10) Patent No.: US 7,132,666 B2
(45) Date of Patent: Nov. 7, 2006

(54) RADIATION DETECTOR AND RADIATION DETECTING ELEMENT

(75) Inventors: Josuke Nakata, Kyoto (JP); Hidemasa Tomozawa, Eniwa (JP); Tomoji Takamasa, Fuchu (JP); Koji Okamoto, Ibaraki (JP)

(73) Assignees: Tomoji Takamasa, Tokyo (JP); Koji Okamoto, Ibaraki (JP); Kyosemi Corporation, Kyoto (JP)

( * ) Notice: Subject to any disclaimer, the term of this patent is extended or adjusted under 35 U.S.C. 154(b) by 186 days.

(21) Appl. No.: 10/467,557

(22) PCT Filed: Feb. 4, 2002

(86) PCT No.: PCT/JP02/00888

§ 371 (c)(1),
(2), (4) Date: Feb. 9, 2004

(87) PCT Pub. No.: WO02/063340

PCT Pub. Date: Aug. 15, 2002

(65) Prior Publication Data

US 2004/0113084 A1 Jun. 17, 2004

(30) Foreign Application Priority Data

Feb. 7, 2001 (JP) .................. 2001-030763

(51) Int. Cl.
*G01T 1/24* (2006.01)
(52) U.S. Cl. .................. 250/370.01
(58) Field of Classification Search .......... 250/338.4, 250/338.1, 370.01, 371
See application file for complete search history.

(56) References Cited

U.S. PATENT DOCUMENTS

| | | | | |
|---|---|---|---|---|
| 4,233,514 A | | 11/1980 | Kingsley | 250/370 |
| 5,693,942 A | * | 12/1997 | Endo et al. | 250/338.1 |
| 6,043,428 A | | 3/2000 | Han et al. | 136/263 |
| 6,320,189 B1 | * | 11/2001 | Ouvrier-Buffet et al. | 250/338.4 |
| 2001/0016094 A1 | * | 8/2001 | Kuhara et al. | 385/14 |

FOREIGN PATENT DOCUMENTS

| | | |
|---|---|---|
| JP | 01-187881 | 7/1989 |
| JP | 08-166461 | 6/1996 |
| JP | 11-211832 | 8/1999 |

OTHER PUBLICATIONS

Huzimura, R., et al., "TSEE Response of Sputtered MgO Films to Low-Energy X-Ray Doses," *Japanese Journal of Applied Physics*, vol. 29, No. 8, pp. 1600-1603 (Aug. 1990).

* cited by examiner

*Primary Examiner*—David Porta
*Assistant Examiner*—Djura Malevic
(74) *Attorney, Agent, or Firm*—Ladas & Parry LLP (57) ABSTRACT

The invention relates to a radiation detector. The detector includes an insulating substrate, a thin-film layer made of semiconductor or insulator formed on the surface of the substrate, at least a pair of electrodes provided on the thin-film layer, voltage applying means for applying a voltage across the electrodes and current detection means for detecting current taken from the electrodes, wherein radiation is detected using the fact that conductance of the thin-film layer changes linearly with respect to radiation intensity due to irradiation with radiation. Preferably, the thin-film layer comprises a metallic oxide. The metallic oxide comprises either one or any combination of two or more selected from titanium oxide, aluminum oxide (alumina), zirconium oxide, iron oxide, zinc oxide, yttrium oxide, manganese oxide, neodymium oxide, ceric oxide, tin oxide, or strontium titanate.

17 Claims, 10 Drawing Sheets

RADIATION DETECTOR AND RADIATION DETECTING ELEMENT

FIELD OF THE INVENTION

The present invention relates to a radiation detector, and more specifically relates to a radiation detector and radiation detecting element configured based on new findings where irradiation of a thin-film made of a semiconductor or insulator with radiation exhibits a sufficient amount of change in conductance of the thin film that is enough for extraction as an external signal.

BACKGROUND ART

Radiation detectors for detecting radiation using semiconductors are in practical use. It is necessary for related semiconductor radiation detectors to be of a thickness that is large enough to absorb radiation. Because of this, it is necessary to from p-n junctions using high-purity single-crystal semiconductors in order to provide depletion in this thick semiconductor to prevent generation of substantial leakage current.

For example, when the energy of detected radiation is 1 MeV or greater, a semiconductor of a thickness of 1 mm or more is necessary even when cadmium telluride having the largest absorption coefficient used in the semiconductors of the related art is adopted and complex pn junction structures for suppressing leakage current have to be adopted.

In addition, with radiation detectors adopting conventional silicon semiconductor or compound semiconductor such as gallium arsenide or cadmium telluride compound semiconductors etc., it is easy for the semiconductor element to become electrically damaged and deteriorate under a high-energy radiation environment of 1 kGy/h or greater such as for nuclear reactors, radioactive waste and its disposal facilities. It is therefore easy for operation to become unstable, for damage to be incurred during use over a short period of time, and for durability to be impaired. Further, with a radiation detector such as an iron dosimeter, the radiation dose cannot be measured at the location emitting the radiation, there is no immediacy, and usage limitations are therefore substantial.

An object of the present invention is therefore to provide a radiation detector, with a simple construction, capable of measuring radiation intensity in a stable manner across a broad range of radiation intensities including a high-intensity intensity range.

DISCLOSURE OF THE INVENTION

Technological means adopted by the present invention for resolving these problems are characterized by an insulating substrate, a thin-film layer made of semiconductor or insulator formed on the surface of the substrate, at least a pair of electrodes provided on the thin-film layer, voltage applying means for applying a voltage across the electrodes, and current detection means for detecting current taken from the electrodes, wherein radiation is detected using the fact that conductance of the thin-film layer changes linearly with respect to radiation intensity due to irradiation with radiation.

The photoconductive effect (internal photoelectric effect), which is a phenomenon where conductance of an insulator or semiconductor increases as a result of irradiation with light is known. As a result of rigorous research performed by the inventors of the current application, the inventors have found that there are sufficient changes in conductance of an insulator or semiconductor irradiated with radiation for this to be extracted as an external signal and that the changes in radiation intensity and conductance are linear.

These findings are completely new. Further, it can be considered in observing that changes in conductance do not depend on the film thickness of the body irradiated with radiation but can be considered to be caused mainly by the generation of carriers at the film surface. Observing just the phenomenon of conductance changing due to irradiation with radiation, this is similar to the internal photoelectric effect, but can be considered to be different to the internal photoelectric effect in that conductance can be confirmed to change as a result of irradiation with beta radiation (which is not electromagnetic radiation). It can also be considered that surface reforming is carried out for a surface irradiated with radiation and that carriers are generated at the surface and/or in the vicinity of the surface. In the present invention, radiation includes γ particles, β-particles, α-particles, X-rays and neutrons.

It is also preferable for the insulating substrate to be an insulating material (for example, alumina) with superior radiation resistance. The thin-film layer forming the radiation detection layer can be comprised of a semiconductor or an insulator for which the conductance changes in a linear manner as a result of irradiation with radiation. This thin-film layer is preferably comprised of, for example, a metallic oxide. Metallic oxide is to include oxide semiconductors and insulators. The metallic oxide film constituting the thin-film layer is preferably a material for which conductance changes in a linear manner due to irradiation with radiation and a material with superior radiation resistance. In a preferred example, the metallic oxide may comprise either one or any combination of two or more selected from titanium oxide ($TiO_2$), alumina ($Al_2O_3$), zirconium oxide ($ZrO_2$), iron oxide ($Fe_2O_3$), zinc oxide (ZnO), yttrium oxide ($Y_2O_3$), manganese oxide ($MnO_2$), neodymium oxide ($Nd_2O_3$), ceric oxide ($CeO_2$), tin oxide ($SnO_2$), or strontium titanate ($SrTiO_3$). Rutile-type titanium oxide or anatase-type titanium oxide can be adopted as the titanium oxide but rutile-type titanium oxide is superior due to its responsiveness. Rutile-type titanium oxide is a semiconductor with superior radiation resistance and the band gap (3.0 eV) of this titanium oxide is smaller than the γ radiation energy (1.1 MeV and 1.3 MeV in the case of cobalt 60).

A range of, for example, 10 nm to 2 mm is adopted for the film thickness of the thin-film layer forming the radiation detection layer but radiation detection is also possible for the order of 100 μm or less, which is revolutionary. With semiconductor radiation detectors of the related art, semiconductor layers having the desired thickness are sandwiched between electrodes provided on both surfaces and the thickness of the semiconductor layer therefore exceeds 100 μm. In one preferred example, the thin-film layer is made using sputtering techniques. The present invention detects radiation using a thin-film layer provided at one surface of a substrate and the film thickness of the thin-film layer is capable of detecting radiation even at thicknesses of less than, for example, 1 μm. Both principles are therefore completely different.

According to the present invention, the radiation detection layer may be formed from a semiconductor layer composed of a semiconductor or an insulator. A pn junction is therefore not required at the semiconductor layer, a semiconductor layer of a substantial thickness is not necessary, and it is not necessary to form the semiconductor layer using a high-purity semiconductor. The structure for the radiation detection element is therefore straightforward, and a cheap radiation detector can be realized.

The voltage applied across the electrodes by the voltage applying means is decided according to the material of the radiation detection layer and the distance between the pair of electrodes but is, for example, a direct current voltage of approximately 5 to 100V. A direct current operational amplifier, for example, is applicable as the current detection means.

When radiation is received by the radiation detection layer with a voltage applied to the pair of electrodes by the voltage applying means, carriers are generated at the surface or in the vicinity of the surface of the radiation detection layer and the carriers generated flow towards one of the electrodes. A change in conductance due to the generation of the carriers is then detected by the current detection means as an electrical signal so the radiation is detected. It is also possible to detect dose of radiation by measuring the electrical signal using the current detection means.

It is also preferable to provide an air-tight shield to cover the surfaces of the radiation detection layer and the surfaces of the pair of electrodes in an air-tight manner so that these surfaces are not exposed to the outside. If the surfaces of the radiation detection layer and the electrodes are exposed, it is possible that gas in the atmosphere will be ionized by the radiation so that a minute ionization current will flow between the electrodes.

It is also preferable to provide an alarm for giving notification that radiation has been detected at the semiconductor radiation detector. It is therefore possible to evacuate rapidly away from radiation because the alarm operates so as to emit an alarm when radiation is detected by the semiconductor radiation detector.

BEST MODE FOR CARRYING OUT THE INVENTION

Figure 1:
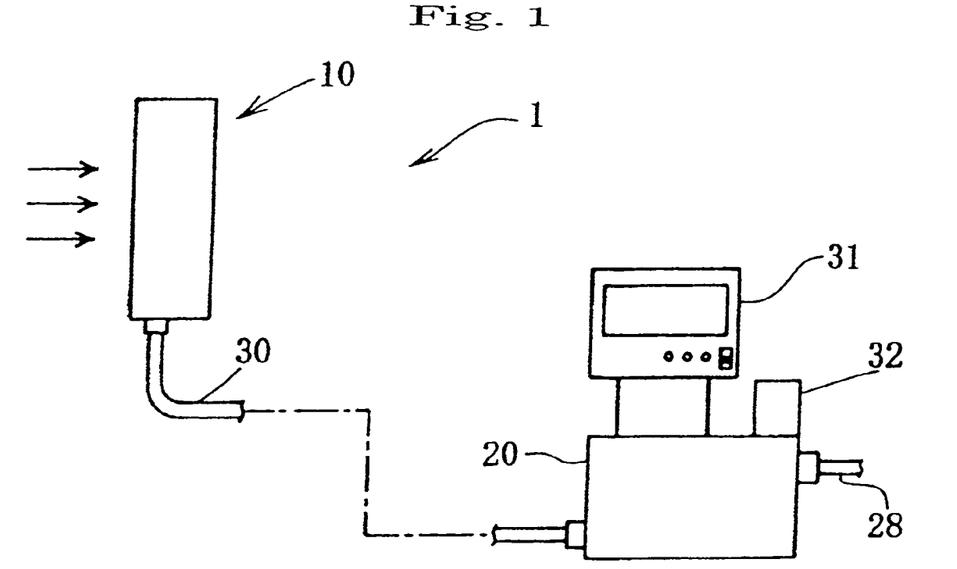
FIG. 1 is a front view of a radiation detector of an embodiment of this invention.

A description is now given of the preferred embodiments of the present invention. As shown in FIG. 1, a radiation detector 1 of this preferred embodiment detects and measures the intensity of γ-rays constituting ionizing radiation.

The radiation detector 1 includes a radiation detection element 10 for detecting radiation, a control unit 20, a coaxial cable 30, a display unit 31, and an alarm 32.

Figure 2:
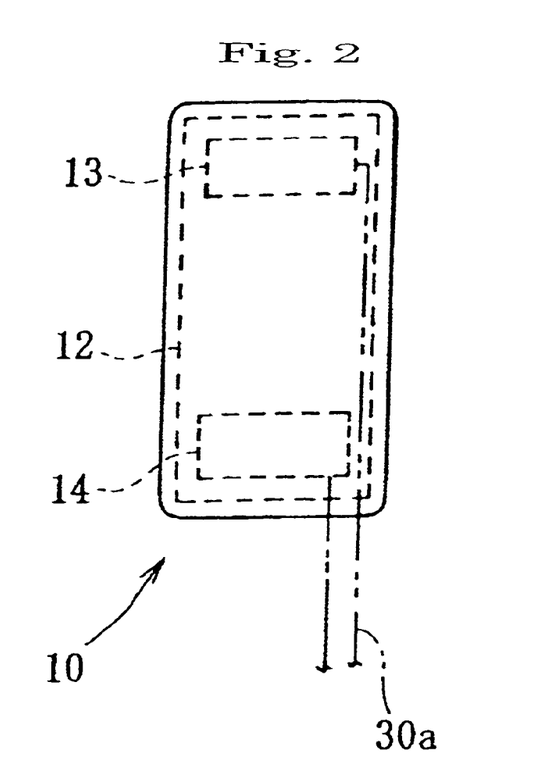
FIG. 2 is a front view of a radiation detection element.
Figure 3:
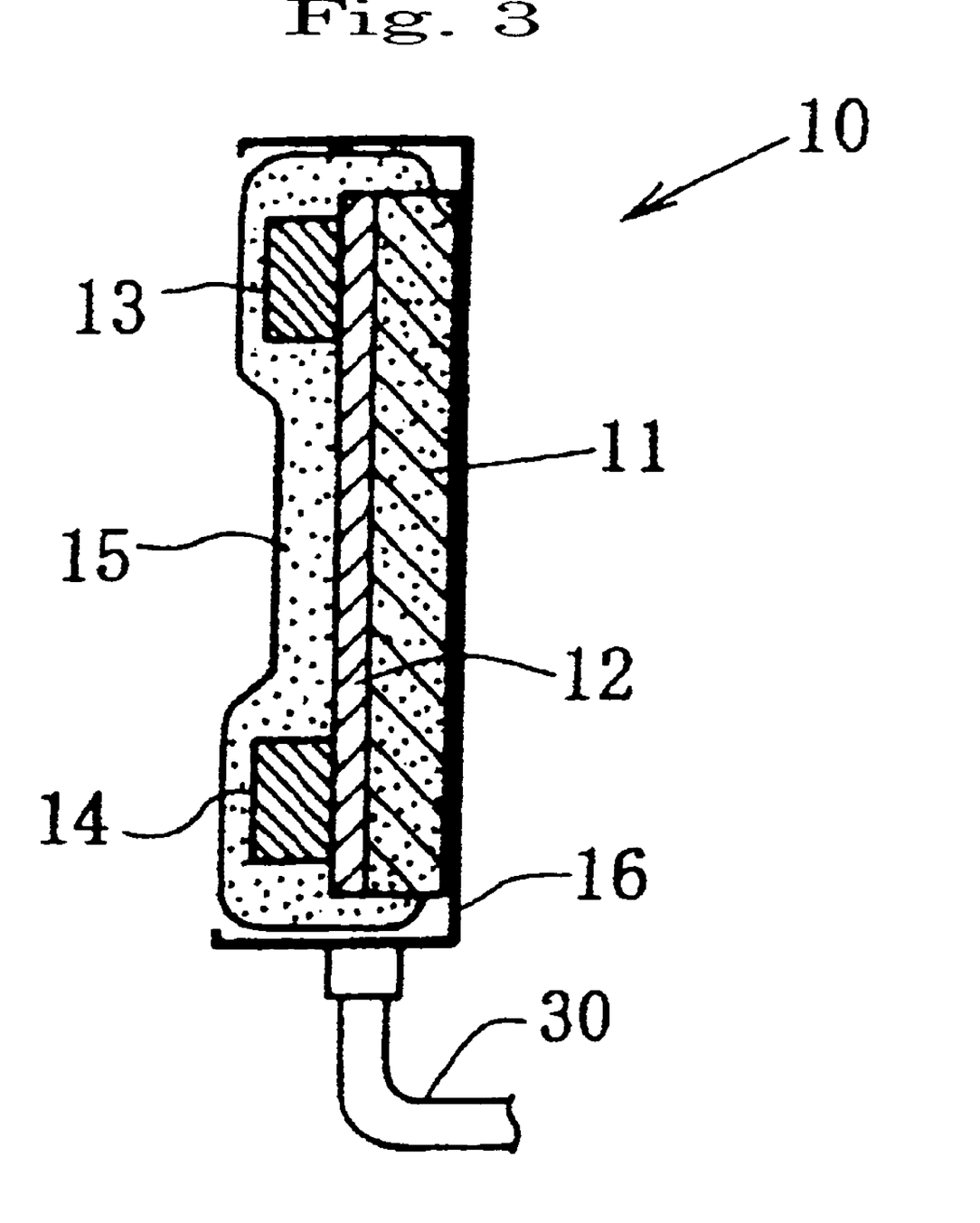
FIG. 3 is a cross-sectional view of a radiation detection element.

As shown in FIG. 2 and FIG. 3, the radiation detection element 10 comprises a substrate 11 made of insulating material, a semiconductor layer 12 consisting of a thin film (for example, 250 nm thick) of rutile type titanium oxide formed on the front surface of the substrate 11, a pair of electrodes 13 and 14 connected to the surface of the semiconductor layer 12, an air-tight cover 15, and a metal case 16 covering the back side and the outside of these items.

The substrate 11 is formed from an insulating material with a superior radiation resistance such as, for example, alumina and is, for example, in the order of 3 to 5 mm thick. The semiconductor forming the semiconductor layer 12 is a semiconductor with superior radiation resistance and a band gap that is lower than γ-ray energy (approximately 0.5 to 3 MeV), with a semiconductor where carriers are created in the vicinity of the surface when a γ-ray is incident to the surface. Rutile-type titanium oxide (TiO2) (band gap approximately 3.0 eV) is applicable as an example of such a semiconductor.

The semiconductor layer 12 can be formed on the surface of the substrate 11 using well-known methods such as sputtering or laser ablation deposition, etc. When a thin-film, for example, 250 nm thick is formed by sputtering on the semiconductor layer 12, sputtering using Argon gas is adopted using a material introduced with a p or n-type titanium oxide dopant. The semiconductor 12 is preferably formed with resistivity as high as possible and with a thin-film that is as thin as possible in order to make dark current low.

The pair of electrodes 13 and 14 provided at the surface of the semiconductor layer 12 may be formed from electro-less plating of a metal thin-film comprised of, for example, a palladium thin-film and a nickel thin-film, subjected to thermal treatment at a temperature of approximately four hundred degrees centigrade to give ohmic contact. The pair of electrodes 13 and 14 are connected to the control unit 20 via two lead-covered coaxial cables 30. The type of metal constituting the electrodes 13 and 14 is not limited providing that conductivity is good.

When the surface of the semiconductor layer 12 and the surfaces of the electrodes 13 and 14 are exposed to the atmosphere, gas in the atmosphere is ionized so as to cause a minute ionization current to flow between the semiconductor layer 12 and the electrodes 13 and 14 due to the radiation. In order to prevent this, an air-tight cover 15 is also provided to cover the surfaces of the semiconductor layer 12 and the electrodes 13 and 14 in an air-tight manner. An alumina coat or a glass coat, for example, approximately 200 nm thick is appropriate as the air-tight cover 15. However, an air-tight shield where a vacuum is maintained within a package may be appropriate.

Figure 4:
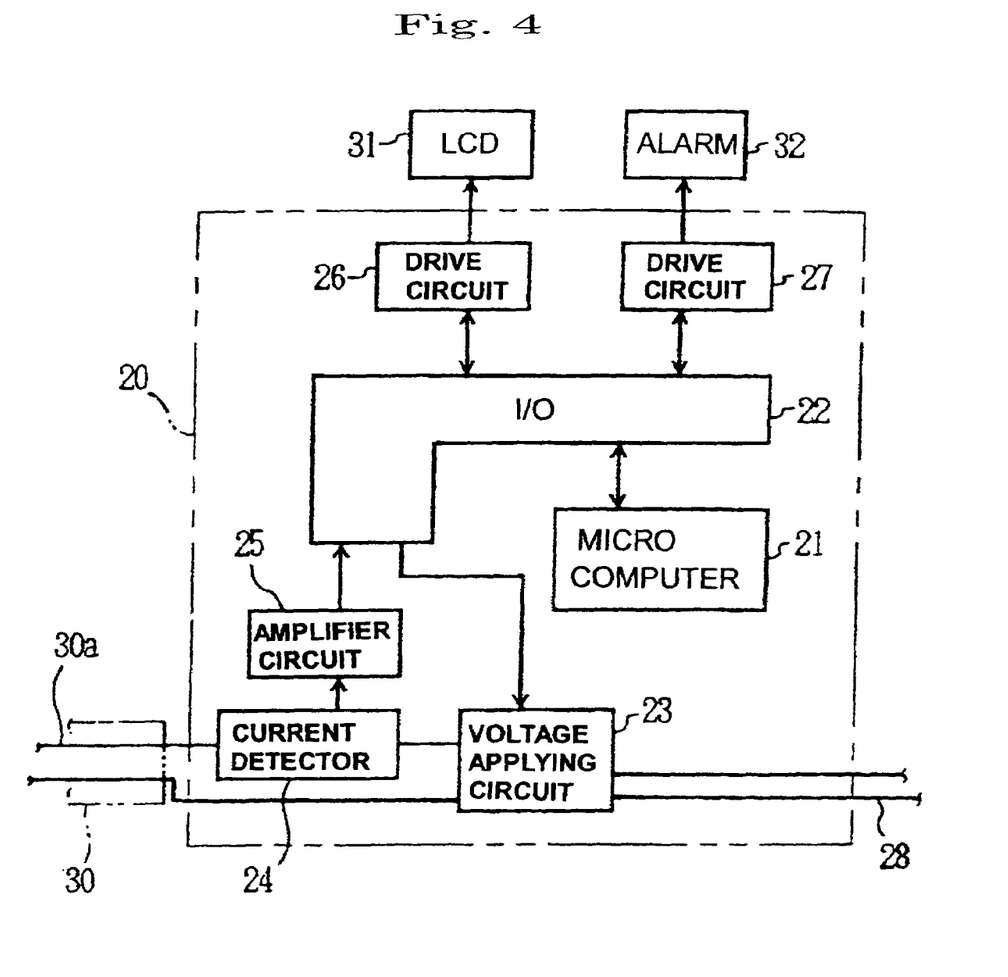
FIG. 4 is a structural view of a control unit.

Next, a description is given of the structure of the control unit 20. As shown in FIG. 4, the control unit 20 comprises a microcomputer 21, an input/output (I/O) interface 22, a voltage applying circuit 23 for applying a direct current voltage of a prescribed voltage (for example, 5V) to electrodes 13 and 14 via the coaxial cable 30, a current detector 24 connected to a cable 30a connected to one electrode 13 of the co-axial cable 30, an amplifier circuit 25 for amplifying an electrical signal detected by the current detector 24, a drive circuit 26 for the display unit 31 comprised of, for example, a liquid crystal display, and a drive circuit 27 for the alarm 32. Further, the voltage applying circuit 23 is connected to an external power supply by a supply cable 28.

The current detector 24 detects magnetic line of force generated as a result of an electrical signal extracted from, for example, the electrode 13, flowing in a solenoid coil via a Hall element, and it is possible to detect the electrical signal to a high degree of precision. The signal detected by the current detector 24 is amplified by the amplifier circuit 25 and supplied to the input/output interface 22, converted to a digital signal by an internal A/D converter, and inputted to the microcomputer 21. Further, a cheap current operational amplifier may be applicable for detecting the electrical signal as the current detector 24.

The microcomputer 21 has a CPU, ROM and RAM. A radiation detection control program for detecting radiation, a display control program for displaying at the display unit 31, and an alarm control program for driving the alarm 32 when ionizing radiation of greater than a prescribed intensity that is detrimental to the human body (radiation consisting of electromagnetic radiation such as γ-rays) is detected are pre-stored in this ROM.

Figure 5:
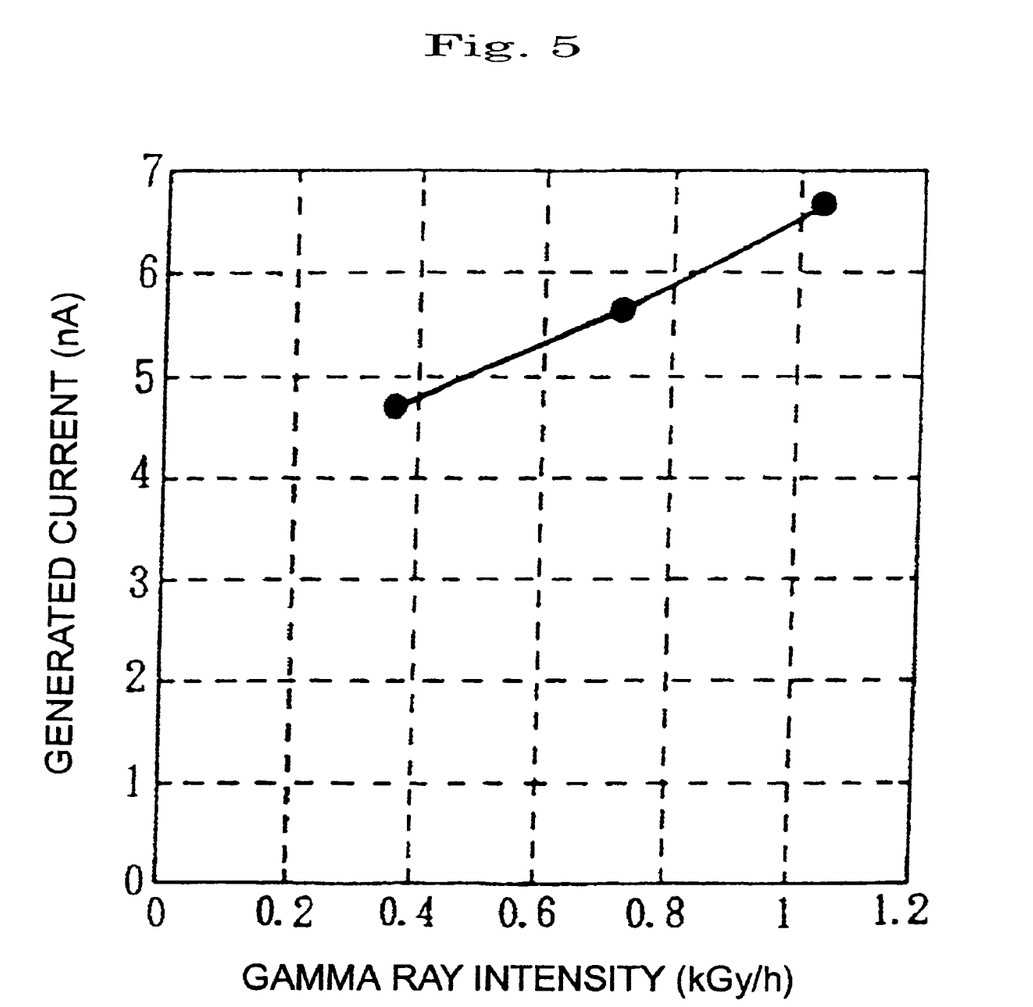
FIG. 5 is a view showing the relationship between γ-ray intensity and emission current.

A description is now given of the principle for detecting radiation using a radiation detection control program. FIG. 5 shows the relationship between emission current generated at the semiconductor layer 12 in the vicinity of the surface of the semiconductor layer 12 by irradiation with radiation when γ-rays are incident to the semiconductor 12 consisting of rutile-type titanium oxide as obtained by experimentation. The relationship between the emission current and γ-ray intensity is a substantially linear proportional relationship and the intensity of the γ radiation can therefore be detected from the current generated due to the irradiation with the radiation.

When a prescribed voltage is applied to the pair of electrodes 13 and 14 by the voltage applying circuit 23 while detecting radiation, a substantially fixed minute current flows from one of the electrodes 13 to the other electrode 14 via the semiconductor layer 12. The current detector 24 normally detects this minute current and updates and stores a detection current value for the most recent prescribed short time (for example, one second) in the buffer of the RAM of the microcomputer 21. When the semiconductor layer 12 receives γ-rays, carriers are induced in the vicinity of the surface of the semiconductor layer 12 as a result of the irradiation by γ-rays, these carriers flow to the electrode 13 so that a current to be extracted changes.

The microcomputer 21 detects microscopic current increases due to irradiation of radiation through performing normal data processing on the current data values updated and stored in the buffer of the RAM using prescribed arithmetic operations and calculates the intensity of γ-rays incident to the semiconductor substrate layer 12 based on these current increases and the characteristic line of FIG. 5 (or based on prescribed arithmetic operation expression in place of the characteristic line). The intensity of the detected γ-rays is displayed both numerically and in the form of a graph at the display unit 31 and when the γ-ray intensity is in excess of a prescribed level, an alarm driven by the alarm 32 is emitted.

This semiconductor radiation detector 1 is suited to detecting and measuring γ-rays at a nuclear power station, radioactive waste, or a radioactive waste disposal plant. The radiation detection element 10 is installed at a location where radiation is to be measured and a unit for the control unit 20, display unit 31 and alarm 32 can be used installed in a monitoring room or control room.

A pn junction is not necessary at the semiconductor layer 12 and a thick semiconductor layer 12 is also not necessary, and it is also not necessary to make the semiconductor layer of high-purity semiconductor, which makes the structure of the semiconductor layer 12 simple. The semiconductor layer 12 can therefore be made cheaply so as to give a low-priced semiconductor detector 1. Because rutile-type titanium oxide with superior radiation resistance is applied as the semiconductor constituting the semiconductor layer 12, it is possible to realize a radiation detector for which operating stability, reliability, and durability are all superior.

Changes in conductance of the semiconductor layer due to irradiation with radiation are principally considered to be based on carriers generated in the vicinity of the surface of the semiconductor layer, and the semiconductor layer only needs to be a thin-film layer and the semiconductor layer 12 can therefore be made from a thin-film. The semiconductor layer 12 can therefore be made small and lightweight, and reduction in manufacturing costs can be achieved.

The surfaces of the semiconductor layer 12 and the pair of electrodes 13 and 14 are covered by the air-tight cover 15 in an air-tight manner so as not to be exposed to the outside. A microscopic ionization current generated by the ionizing of gas in the atmosphere by the radiation therefore does not flow at the electrodes and minute current due to irradiation with radiation can be reliably detected. The alarm 32 is provided to give notification that radiation is detected and the alarm is emitted when the radiation detection element 10 detects radiation. A worker that is approaching a source of radiation can therefore rapidly distance themselves from the radiation.

Figure 6:
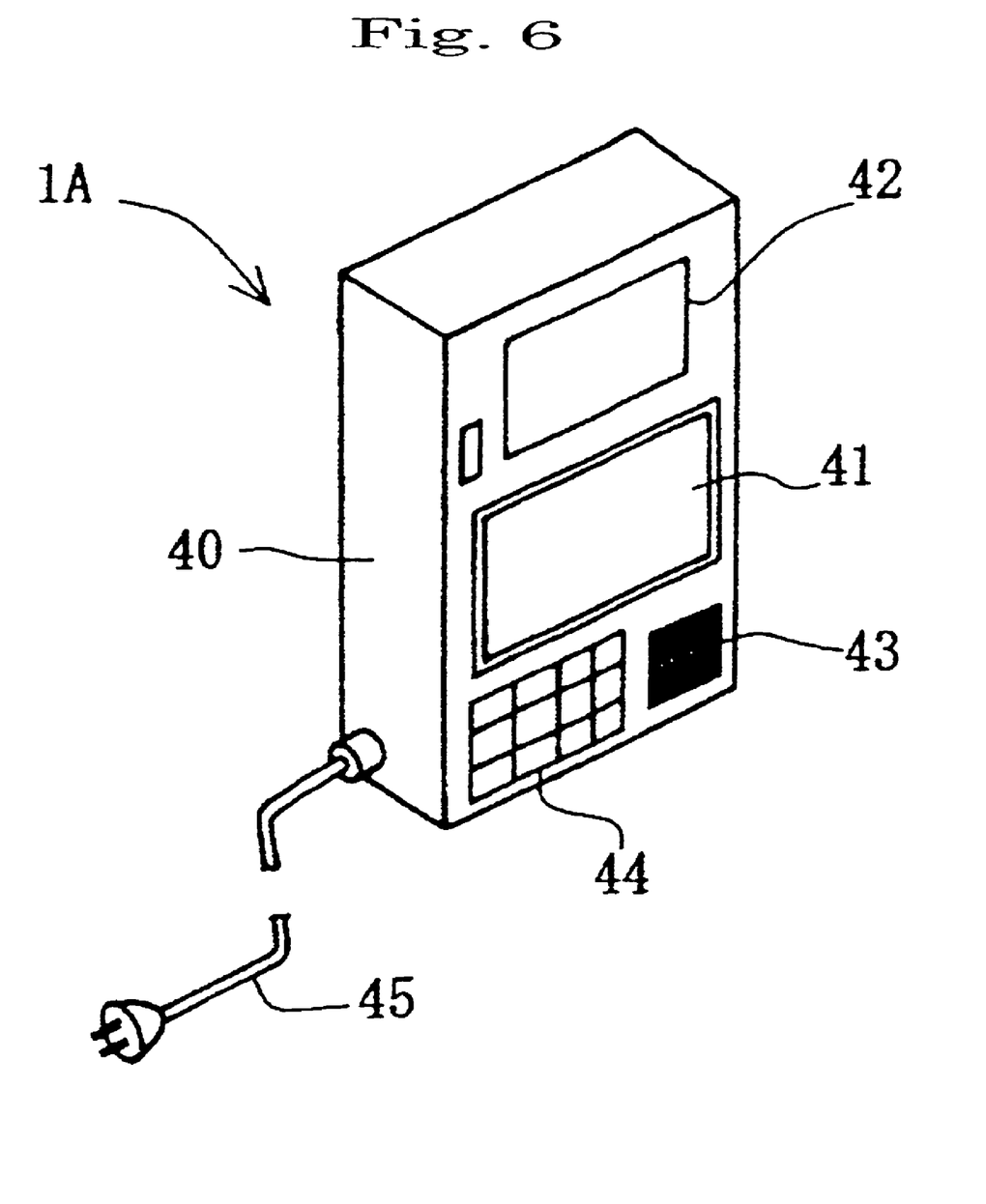
FIG. 6 is a perspective view of a radiation detection element used in a further embodiment.

Next, a description is given of a preferred embodiment for a configuration for an integrated, small, portable detector constituting a radiation detector 1A of the present invention. The radiation detector 1A comprises a case 40, a display unit 41 installed on the display side of the case 40, a radiation detection element 42 installed in the vicinity of the display side of the case 40, an alarm 43 installed in the vicinity of the display side of the case 40, a control unit (not shown) installed at the inside of the case 40, an operation panel 44 provided at the display part of the case 40, and a supply line 45 for connecting to a power supply.

The radiation detector 1A has the same structure as the radiation detector 1 with the exception of the integrated structure, and brings about the same effects and results. The radiation detector 1A is both small and portable and can therefore be transported to a nuclear reactor, to radioactive waste, or to a radioactive waste disposal plant. High intensity radiation generated at these places can therefore be directly and easily detected and safety management with respect to radiation can be improved.

A description is given of the thin-film layer for detecting the radiation based on rutile-type titanium oxide but the thin-film layer adopted in the present invention is by no means limited to rutile-type titanium oxide and other semiconductors or insulators may also be used providing that conductance changes due to irradiation with radiation. Strontium titanate is also applicable as the semiconductor for forming the semiconductor layer in place of the rutile-type titanium oxide. Strontium titanate is a semiconductor having a superior radiation resistance and the band gap of strontium titanate is smaller than the energy of γ-rays. Further, alumina can be given as one appropriate example as an insulating material that can be adopted as the thin-film layer.

The substrate 11 can also be constructed from glass or from other insulating materials. The configuration for the pair of electrodes 13 and 14 is also by no means limited to that described above. The number of electrodes is not limited to a pair and a larger number of electrodes may also be used. The current detector 24 merely illustrates one example of a current detector, and other current detectors with other configurations capable of detecting microscopic currents are also applicable as the current detector. A number of current detection means well-known to one skilled in the art can be used with this type of detector.

A configuration where electricity is supplied using a battery in place of the supply line can also be adopted so as to make it possible to make semiconductor radiation detectors 1A of a smaller and light-weight structure that can be installed by an individual worker. In addition, various appropriate modifications of the preferred embodiments are possible without deviating from the spirit of the present invention.

Figure 7:
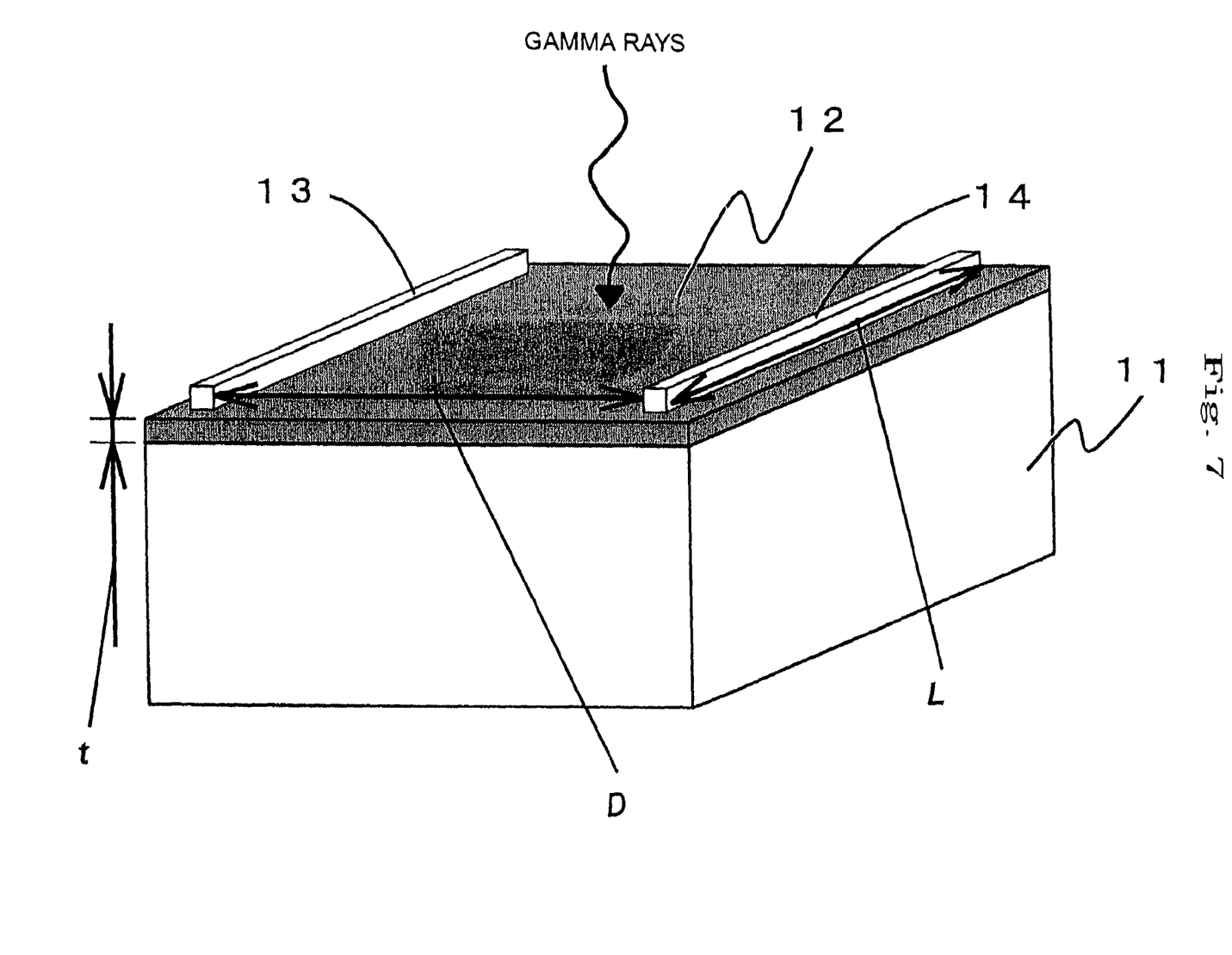
FIG. 7 is a perspective view of a radiation detection element used in experiments.

A description is now given of a practical example of the present invention. FIG. 7 is a perspective view of a radiation detection element used in these experiments. The radiation detection element comprises a substrate 11 formed of alumina, a thin-film semiconductor layer 12 for detecting radiation consisting of rutile-type titanium oxide provided at the surface of the substrate 11, and a pair of strip-shaped electrodes 13 and 14 provided facing each other with a gap therebetween on the semiconductor layer 12. One of the pair of electrodes 13 and 14 constitutes a source, with the other constituting a drain, with the thin-film semiconductor layer 12 then constituting a gate for controlling current flowing due to irradiation with radiation.

As a method for making this kind of element, a rutile-type titanium oxide film is formed on an insulating substrate 11 composed of alumina by sputtering, and the opposing electrodes 13 and 14 are formed on the surface of the titanium oxide. Describing the film-forming method in more detail, the film-forming method is a helicon sputtering method with a film-forming rate in the order of 10 to 100 nm/h, with the film-forming temperature being controlled to be fixed for manufacture in a range from 20 to 800 degrees centigrade. In FIG. 7, the film thickness of the thin-film comprising the radiation detection layer is taken to be t, distance between the pair of electrodes is taken to be D, and the length of the electrodes is taken to be L. A fixed voltage is applied as the bias voltage to the electrodes 13 and 14 and measurement is carried out.

Figure 8:
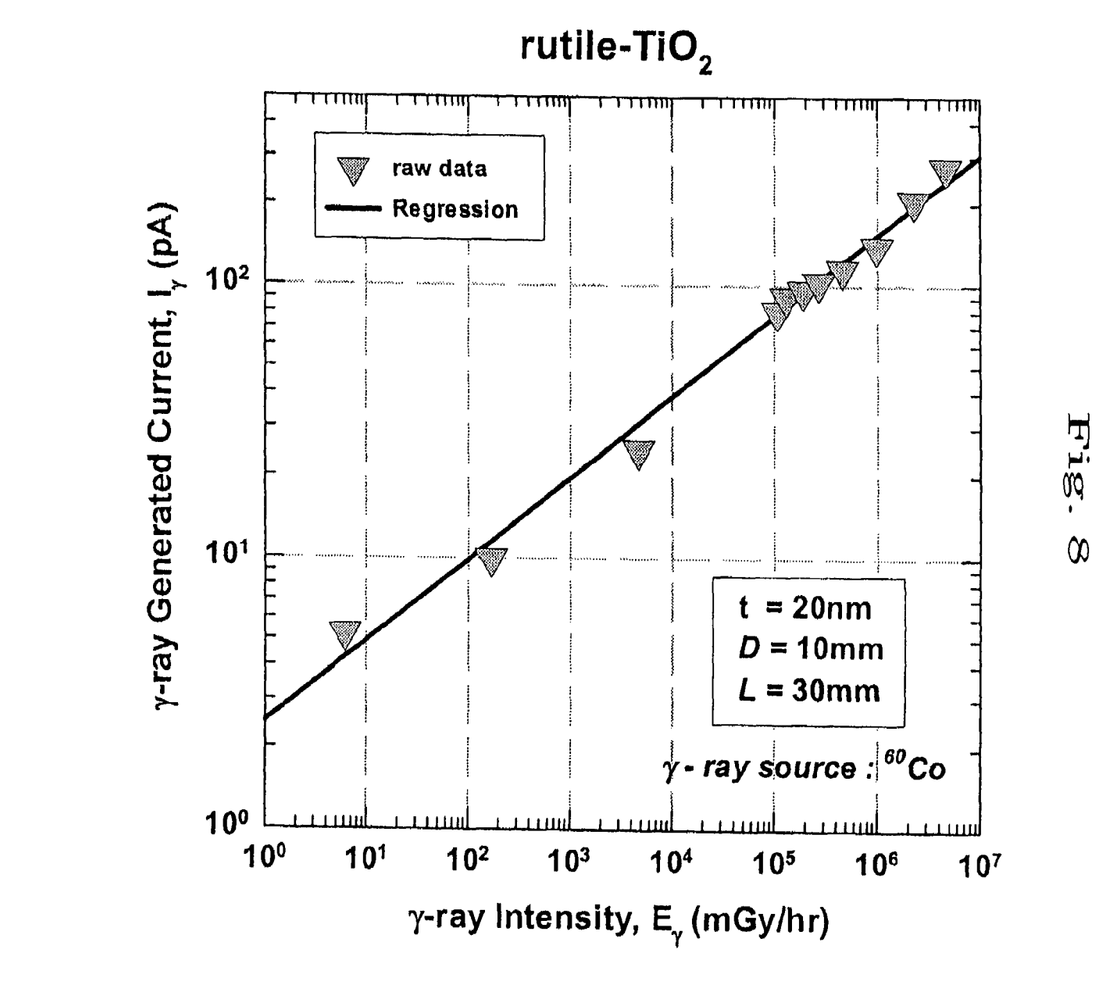
FIG. 8 is a view showing a relationship between γ-ray intensity and emission current.

FIG. 8 is a graph showing the relationship between γ-ray intensity (horizontal axis) and current generated (vertical axis) when the thin-film layer is rutile-type titanium oxide. The γ-ray source is $^{60}$Co, with t=20 nm, D=10 mm, and L=30 mm. As is clear from the graph, it can be understood that the current value (this may also be replaced with conductance) with respect to the γ-ray intensity changes in a linear manner. Further, it can be understood that the current changes in a linear manner in the strong radiation intensity region referred to as kGy/hr. Namely, the radiation detection element can also be used as a radiation detector over a broad range of intensities from low intensities in the mGy/hr order to high intensities in the kGy/hr order.

Figure 9:
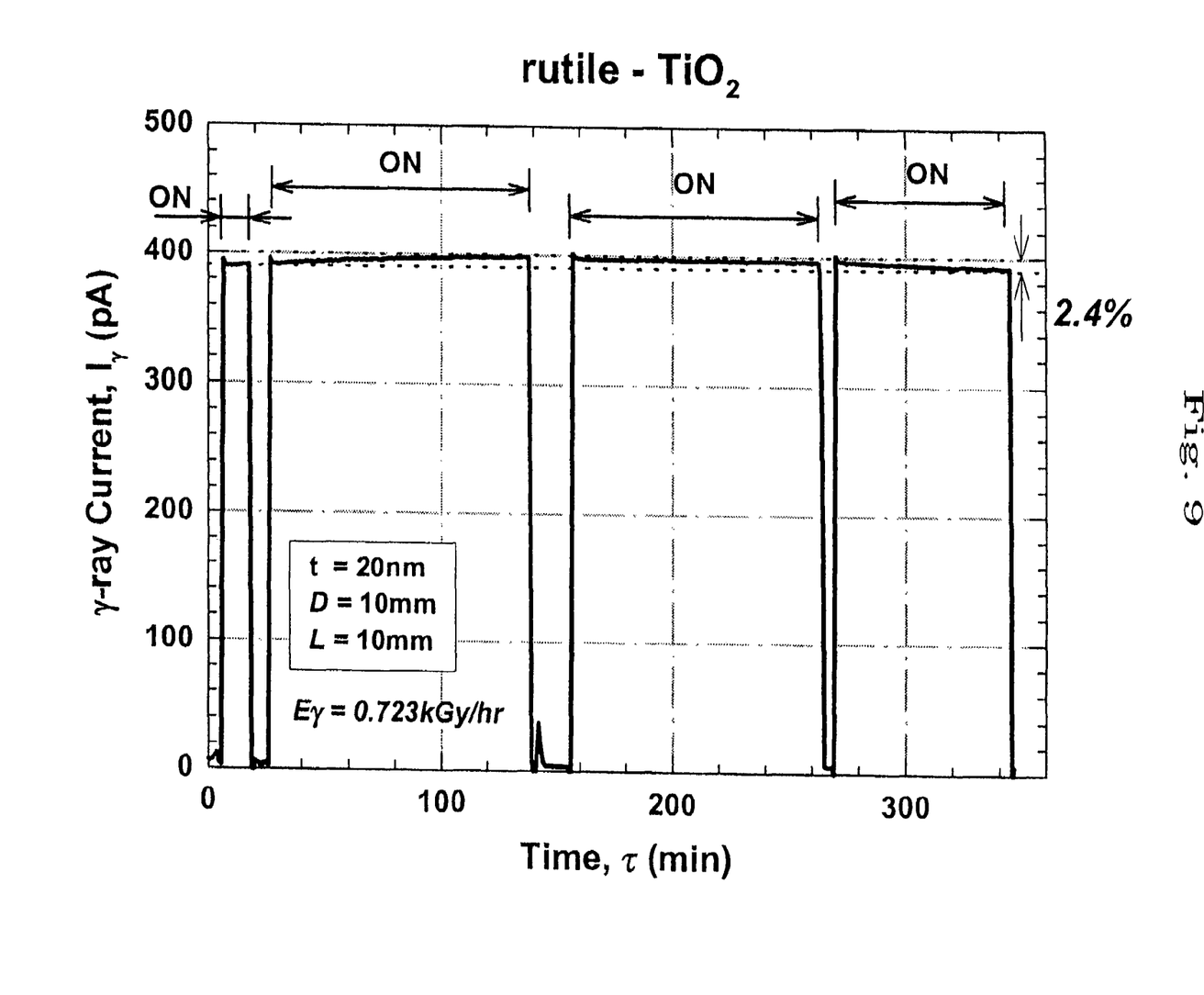
FIG. 9 is a view showing radiation detection response and stability.

FIG. 9 is a graph showing responsiveness and stability when the thin-film layer is rutile-type titanium oxide. Here, the horizontal axis is time, the vertical axis is current, and the radiation intensity is 0.723 kGy/hr. From the drawings, it can be understood that the response speed with respect to the γ-ray source going on and off is within one second. Further, current error is stable at within 2.4%.

Figure 10:
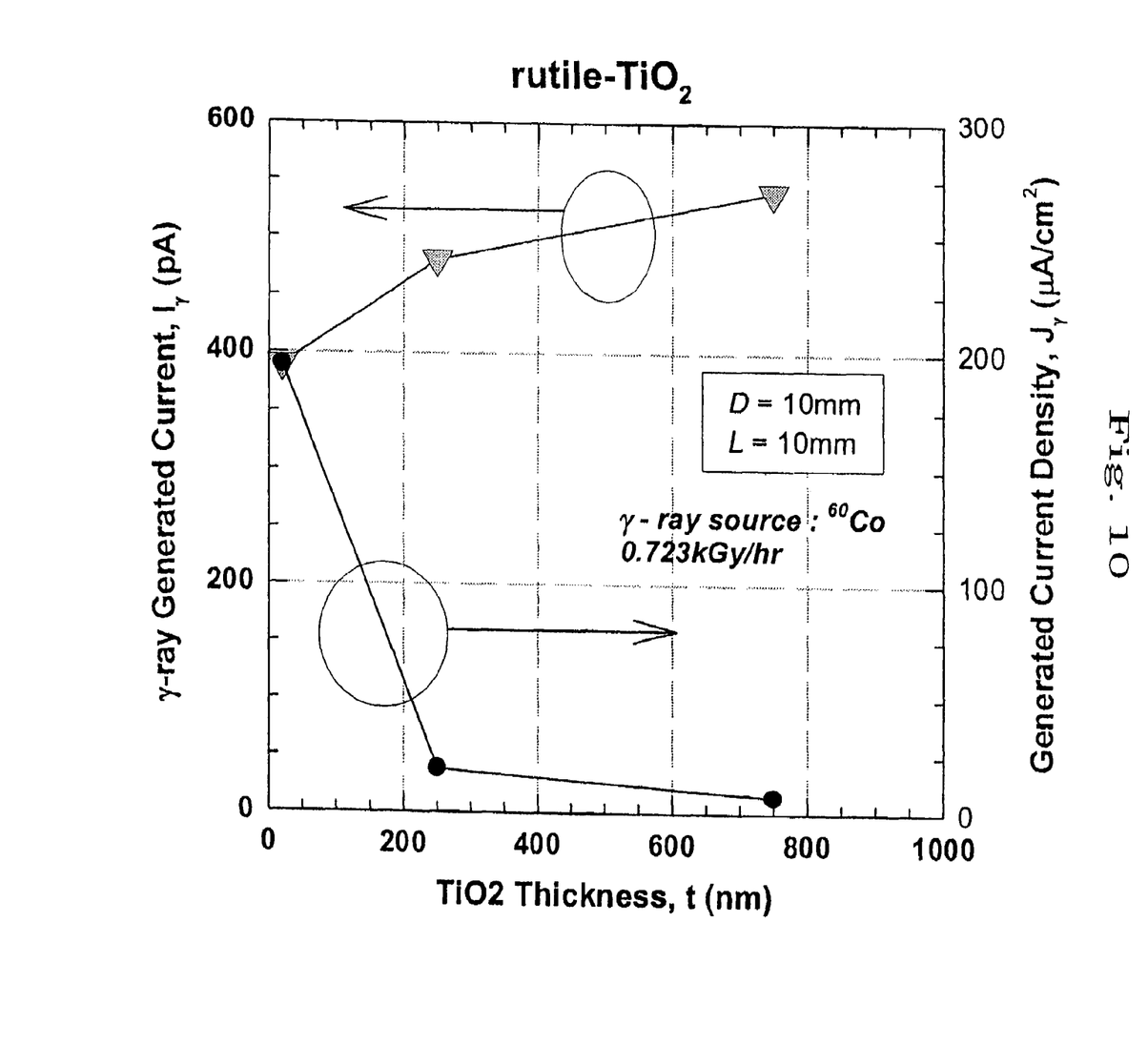
FIG. 10 is a view showing a relationship between film thickness of a radiation detection layer and emission current.

FIG. 10 is a graph showing the relationship between film thickness (horizontal axis), current (vertical axis, left side), and current density (vertical axis, right side) when the thin-film layer is rutile-type titanium. Current and current density are measured at three points of differing film thickness (20 nm, 250 nm, 750 nm). It can be understood that current increases as film thickness of the thin-film layer increases but that the degree of dependence of the current on the film thickness is small. Changes in the current (conductance) accompanying irradiation with radiation can be considered to mainly be based on the generation of carriers at the surface of the thin-film layer.

Figure 11:
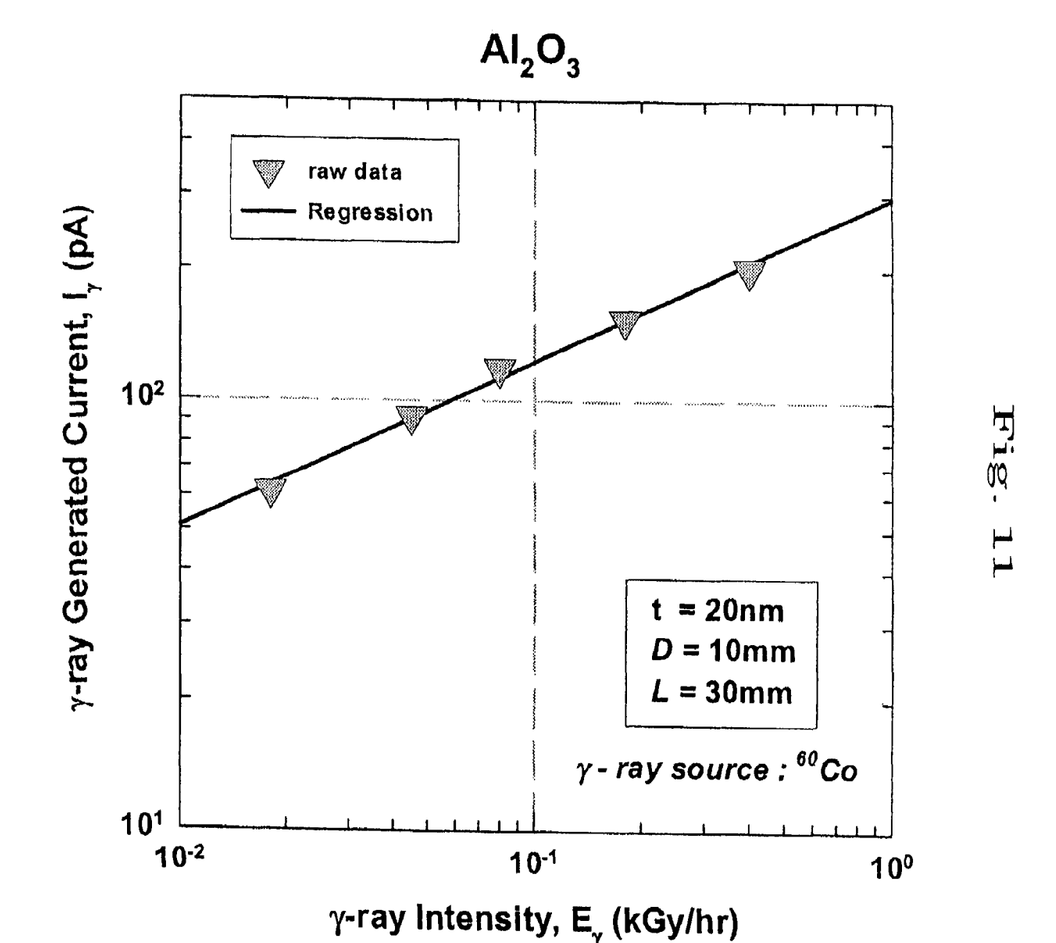
FIG. 11 is a view showing the relationship between γ-ray intensity and emission current when the radiation detection layer is alumina.

FIG. 11 is a graph showing the relationship between γ-ray intensity (horizontal axis) and current generated (vertical axis) when the thin-film layer is alumina ($Al_2O_3$). The γ-ray source is $^{60}$Co, with t=20 nm, D=10 mm, and L=30 mm. The alumina layer is made using helicon sputtering techniques on an alumina substrate. As is clear from the graph, it can be understood that the current value (conductance) with respect to the γ-ray intensity changes in a linear manner.

Change in current can also be observed for β-rays. A current of 330 pA is generated when irradiating $^{90}$Sr of 740 MBq at rutile-type titanium oxide of t=750 nm, D=10 mm, and L=30 mm at a position 5 cm from the surface of a sample. The current falls to 200 pA if this is covered using aluminum foil. The subtracted 130 pA is current generated by beta radiation. Further, it is found that the response characteristic with respect to a source of $^{226}$Ra is similar to those of $^{60}$Co.

INDUSTRIAL APPLICABILITY

A material of superior radiation resistance is applicable as the semiconductor or insulator forming the radiation detection layer. This enables the implementation of a radiation detector with superior operating stability, reliability, and durability even under high-intensity radiation. The radiation detector of the present invention can be made both small and portable and can therefore directly and easily detect high-intensity radiation at nuclear reactors, radioactive waste, or at radioactive waste disposal plants and safety management with respect to radiation can be improved.

The invention claimed is:

1. A radiation detector for detecting ionizing radiation, said detector comprising:
   (a) an insulating substrate;
   (b) a thin-film layer made of semiconductor or insulator formed on the surface of the substrate;
   (c) at least a pair of electrodes provided on the thin-film layer;
   (d) voltage applying element for applying a voltage across the electrodes; and
   (e) current detection element for detecting current that is generated in the thin-film layer taken from the electrodes, wherein (f) ionizing radiation is detected using the fact that conductance of the thin-film layer changes linearly with respect to ionizing radiation intensity due to irradiation with ionizing radiation.

2. The radiation detector of claim 1, wherein the ionizing radiation comprises beta particles.

3. The radiation detector of claim 1, wherein the ionizing radiation comprises gamma rays.

4. The radiation detector of claim 1, wherein the film thickness of the thin-film layer is 1 µm or less.

5. The radiation detector of claim 1, wherein the thin-film layer is made using sputtering techniques.

6. The radiation detector of claim 1, further comprising an air-tight cover for covering the surfaces of the layer and the electrodes in an air-tight manner so as not to be exposed to outside.

7. The radiation detector of claim 1, wherein the thin-film layer comprises a metallic oxide.

8. The radiation detector of claim 7, wherein the metallic oxide comprises either one or any combination of two or more selected from titanium oxide, aluminum oxide (alumina), zirconium oxide, iron oxide, zinc oxide, yttrium oxide, manganese oxide, neodymium oxide, ceric oxide, tin oxide, or strontium titanate.

9. The radiation detector of claim 8, wherein the titanium oxide is rutile-type titanium oxide.

10. A radiation detecting element for detecting ionizing radiation, said detecting element comprising:
  (a) an insulating substrate,
  (b) a thin-film layer made of semiconductor or insulator formed on the surface of the substrate, and
  (c) at least a pair of electrodes provided on the thin-film layer, wherein current to be detected is generated in the thin-film layer and wherein ionizing radiation is detected using the fact that conductance of the thin-film layer changes linearly with respect to ionizing radiation intensity due to irradiation with ionizing radiation.

11. The radiation detecting element of claim 10, wherein the ionizing radiation comprises beta particles.

12. The radiation detecting element of claim 10, wherein the ionizing radiation comprises gamma rays.

13. The radiation detecting element of claim 10, wherein the film thickness of the thin-film layer is 1 μm or less.

14. The radiation detecting element of claim 10, wherein the thin-film layer is made using sputtering techniques.

15. The radiation detecting element of claim 10, wherein the thin-film layer comprises a metallic oxide.

16. The radiation detecting element of claim 15 wherein the metallic oxide comprises either one or any combination of two or more selected from titanium oxide, aluminum oxide (alumina), zirconium oxide, iron oxide, zinc oxide, yttrium oxide, manganese oxide, neodymium oxide, ceric oxide, tin oxide, or strontium titanate.

17. The radiation detecting element of claim 16, wherein the titanium oxide is rutile-type titanium oxide.

* * * * *